(12) United States Patent
Yagi et al.

(10) Patent No.: US 6,775,744 B2
(45) Date of Patent: Aug. 10, 2004

(54) DISK MEMORY DEVICE

(75) Inventors: Satoshi Yagi, Ohi (JP); Xiaoming Jiang, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 10/075,400

(22) Filed: Feb. 15, 2002

(65) Prior Publication Data

US 2003/0046489 A1 Mar. 6, 2003

(30) Foreign Application Priority Data

Sep. 5, 2001 (JP) ........................................ 2001-268195

(51) Int. Cl.[7] .............................................. G06F 12/00
(52) U.S. Cl. .......................... 711/119; 711/129; 711/137
(58) Field of Search ................................ 711/113, 119, 711/145, 129, 152; 710/5, 38; 712/204; 714/48

(56) References Cited

U.S. PATENT DOCUMENTS 5,778,430 A * 7/1998 Ish et al. .................... 711/133
6,629,200 B1 * 9/2003 Kanamaru et al. .......... 711/113

FOREIGN PATENT DOCUMENTS

| JP | 60-146348 | | 8/1985 |
| JP | 3-37747 | * | 2/1991 |
| JP | 9-305491 | * | 11/1997 |

* cited by examiner

Primary Examiner—Jack A. Lane
Assistant Examiner—Thang Ho
(74) Attorney, Agent, or Firm—McDermott Will & Emery LLP (57) ABSTRACT

When only one type of a memory having an access rate necessary for high-speed data processing is equipped with a subsystem so as to accommodate the entire amount of storage required for the subsystem, a considerable rise in costs occurs. Therefore, in order to keep the rise in cost to a minimum, high-speed memory of a storage capacity required for the high-speed processing and low-speed memory of a storage capacity that can be safely employed for low-speed processing are both equipped with the disk memory system. With this arrangement, the rise in costs can be kept to a minimum, and access time to the memory can be reduced. The performance of the disk memory system can be thereby improved.

13 Claims, 9 Drawing Sheets

TRANSFER OF 1 PIECE OF DISCONTINUOUS DATA WITH
HIGH-SPEED MEMORY

19 ACCESS DETERMINATION
21 DATA TRANSFER FROM HPC TO DMA CTL
23 PARITY GENERATION
25 DATA TRANSFER FROM DMA CTL TO DPC

24 DATA TRANSFER FROM MEMORY TO DMA CTL
22 DATA TRANSFER FROM DMA CTL TO MEMORY
20 SETTING HPC, DMA CTL, AND DPC

FIG. 9B

TRANSFER OF 1 PIECE OF DISCONTINUOUS DATA WITH
LOW-SPEED MEMORY

19 ACCESS DETERMINATION
21 DATA TRANSFER FROM HPC TO DMA CTL
23 PARITY GENERATION
25 DATA TRANSFER FROM DMA CTL TO DPC

24 DATA TRANSFER FROM MEMORY TO DMA CTL
22 DATA TRANSFER FROM DMA CTL TO MEMORY
20 SETTING HPC, DMA CTL, AND DPC

DISK MEMORY DEVICE

BACKGROUND OF THE INVENTION

The present invention relates to device in a subsystem for keeping a rise in costs to a minimum and reducing access time to a memory, thereby improving the performance of the subsystem. In the subsystem, data from a host and parity data are stored in a memory.

Conventionally, as a cache memory contained in a disk memory device, a single type of memory is employed. In the disk memory device, data transferred from the host and parity data generated in the disk memory device are stored. Thus, for both of data processing that has to be performed at a high speed and data processing that may be performed at a low speed, the memory with the same access rate was employed.

There is provided a type of a system equipped with a high-speed storage and a low-speed storage. In this system, the data from the host is first stored in the high-speed storage. Then, if the high-speed storage has become full, the low-speed storage is used next. Among the systems of this type are those disclosed in JP-A-60-146348 and JP-A-3-37747. Generally, high-speed storages are more expensive than the low-speed storages. Under normal conditions, if processing can be performed by the high-speed storage alone, the performance of the system will not degrade. Therefore, the system is configured as follows: instead of using the high-speed memory alone for data processing, the low-speed memory is also employed. Then, for the amount of storage normally used, the high-speed storage is employed, and for the amount of storage more than the storage amount normally used, the low-speed storage is employed. With this arrangement, requirements for performance and cost are both satisfied.

SUMMARY OF THE INVENTION

As the storage capacity of the disk memory device in the form of the subsystem increases due to an increase in the storage capacity of a hard disk, the storage capacity of the cache memory equipped with the disk memory device increases correspondingly. In this situation, if only one type of the memory with an access rate for data processing that has to be performed at a high speed is employed as the cache memory, a considerable rise in costs occurs.

The object of the present invention is to provide a disk memory device equipped with both high-speed memory and low-speed memory, thereby allowing a rise in costs to be kept to a minimum. In this system, for the amount of storage required for data processing that has to be performed at the high speed, the high-speed memory is employed, and for the amount of storage required for data processing that can be safely performed at a low speed, the low-speed memory is employed.

Other objects, features and advantages of the invention will become apparent from the following description of the embodiments of the invention taken in conjunction with the accompanying drawings.

DESCRIPTION OF THE EMBODIMENTS

As an example of a disk memory device according to the present invention, a disk array subsystem will be taken, and an embodiment of the present invention will be described with reference to FIGS. 1 to 9B.

Figure 1:
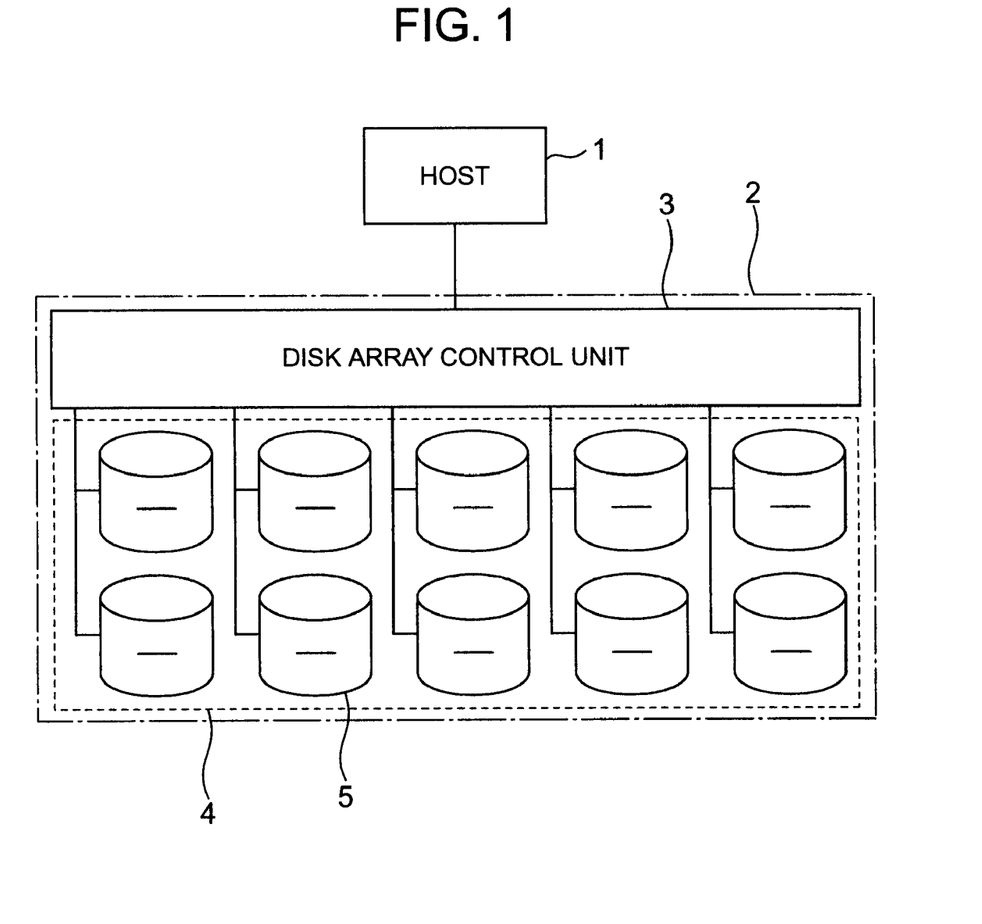
FIG. 1 is a block diagram showing a disk array subsystem.

FIG. 1 shows connection between a disk array subsystem (2) and a HOST (1). The disk array subsystem (2) comprises a disk array control unit (3) and a hard disk unit (4) that includes a plurality of hard disk drives (HDDs) (5). The disk array subsystem (2) is a disk memory device where, parity, which is guarantee code, is appended to data that has been transferred from the HOST (1). Then, the data and parity data are stored in the hard disk unit (4) having a plurality of the hard disk drives disposed in an array. In the disk array subsystem (2), high-speed data processing is performed by parallel operations in the hard disk drive unit (4). Further, the parity is appended to the data. Reliability of the disk array subsystem is thereby improved.

Figure 2:
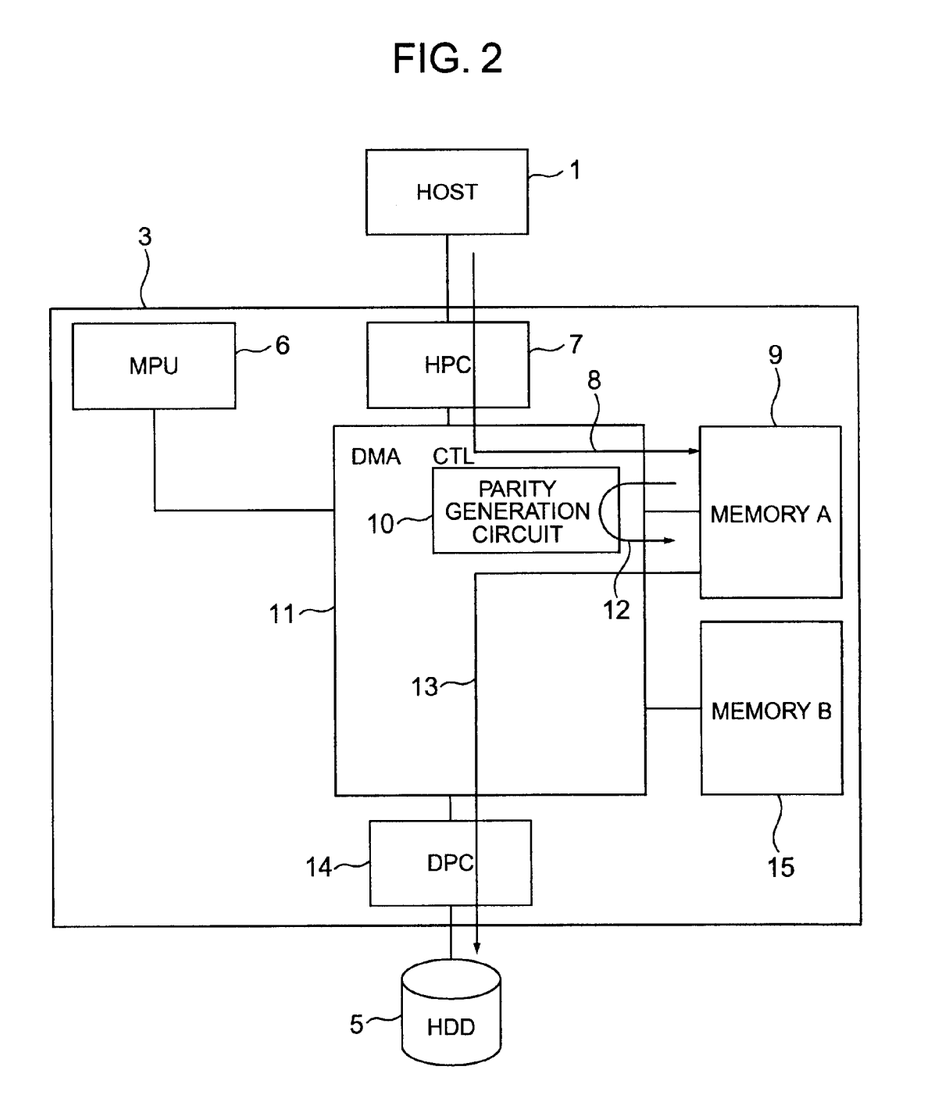
FIG. 2 is a block diagram showing flows of data in the disk array subsystem.

FIG. 2 shows flows of data from the HOST (1) to an HDD (5). The disk array control unit (3) comprises an MPU (6) for controlling the overall disk array subsystem, memories for temporarily saving data, an HPC (host interface protocol controller) (7) for performing data control, a DMA CTL (dynamic memory access controller) (11), and a DPC (drive interface protocol controller) (14). The HPC (7) is a host interface for controlling transfer of control information and data between the HOST (1) and the DMA CTL (11). The HPC (7) has a function of reporting to the MPU (6) via the DMA CTL (11), that access from the HOST (1) has been received, upon reception of the access from the HOST (1). The HPC (7) has a function of causing transfer of data to be performed between the memories (9) and (15) via the DMA CTL (11), too. The DMA CTL (11) has a function of causing transfer of data to be performed between the HPC (7), memory A(9), and memory B(15) and controlling the memories A(9) and B(15), on the basis of a command from the MPU (6). The DPC (14) is a disk interface that controls transfer of data between the DMA CTL (11) and an HDD (5). Two types of memories are used; the memory A (9) indicates high-speed memory, while the memory B(15) indicates low-speed memory. The capacity ratio of the high-speed memory to the low-speed memory is determined according to the type of data transferred from the HOST (1). When access from the HOST (1) is made, the HPC (7) reports to the MPU (6) on the access. Then, the MPU (6) analyzes the type of the access (whether the access is associated with a write request, a read request, or the like) from the value of a register in which the types of access to the HPC (7) are registered. The MPU activates the DMA CTL (11). When the access is made for a write operation, data is stored in the memory. When the access is made for a read operation, data is outputted from the memory to the HPC. FIG. 2 shows data flows (8), (12), and (13) when a data write request is made from the HOST (1). After passing the HPC (7) and the DMA CTL (11), data is stored in the memory A(9). Then, on the basis of the data, the parity generation circuit (10) generates parity data, for storage in the memory A(9). Thereafter, the data and the parity data are stored in an HDD (5) via the DPC (14).

Figure 3:
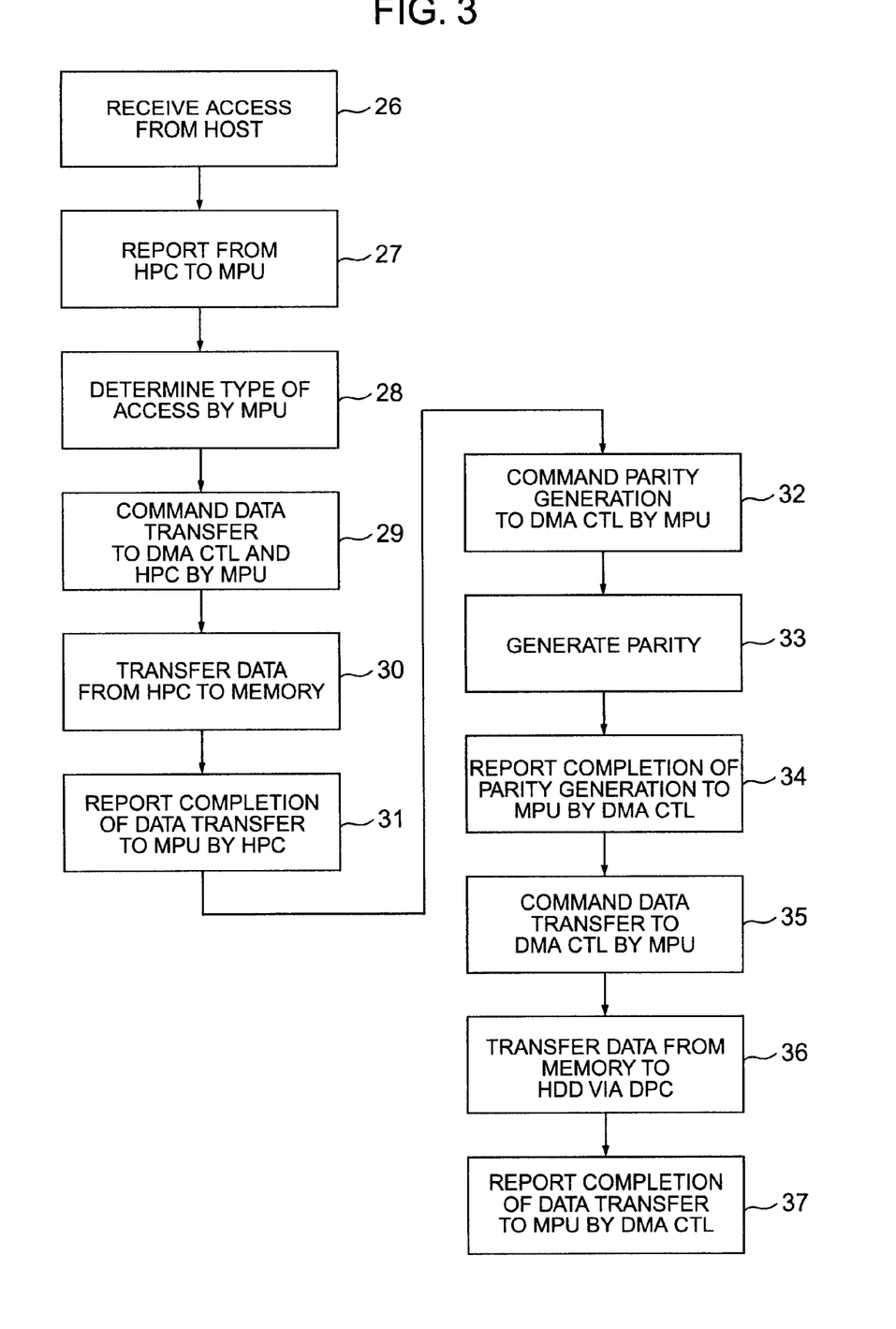
FIG. 3 is a flowchart showing processes.

FIG. 3 is a flowchart showing the flow of data from the HOST(1) to the HDD (5). In step (26), the HPC (7) received access from the HOST (1). Then, the HPC (7) reports to the MPU (6) that it has received the access from the HOST (1). In step (28), the MPU (6) that has received the report reads the value of the register in the HPC (7) to determine the type of the access. This embodiment shows the case where the access has been made according the data write request. In step (29), The MPU (6) activates the DMA CTL (11) and the HPC (7). In step (30), the activated HPC (7) and DMA CTL (11) causes the data to be transferred to the memory A(9). The flow of the data at this point is indicated by reference numeral (8) in FIG. 2. Upon completion of the data transfer, the HPC (7) reports completion of the data transfer to the MPU (6) in step (31). In order to generate parity for the data stored in the memory A(9), the MPU (6) activates the parity generation circuit in the DMA CTL(11) in step (32). The activated DMA CTL (11) reads the data from the memory A(9), selects and appends parity to the data, and then stores parity data in the memory A(9) in step (33). The data flow at this point is indicated by reference numeral (12) in FIG. 2. In step (34), upon completion of parity generation, the DMA CTL (11) reports completion of the parity generation to the MPU (6). In step (35), in order to store the data from the HOST (1) and the parity data, both stored in the memory A(9), in the HDD, the MFU (6) activates the DMA CTL (11) and the DPC (14). The activated DMA CTL (11) and DPC (14) causes the data to be transferred to the HDD (5) in step (36). The flow of data at this point is indicated by reference numeral (13) in FIG. 2. In step (37), upon completion of the data transfer, the DPC (14) reports completion of the data transfer to the MPU (6).

Figure 4:
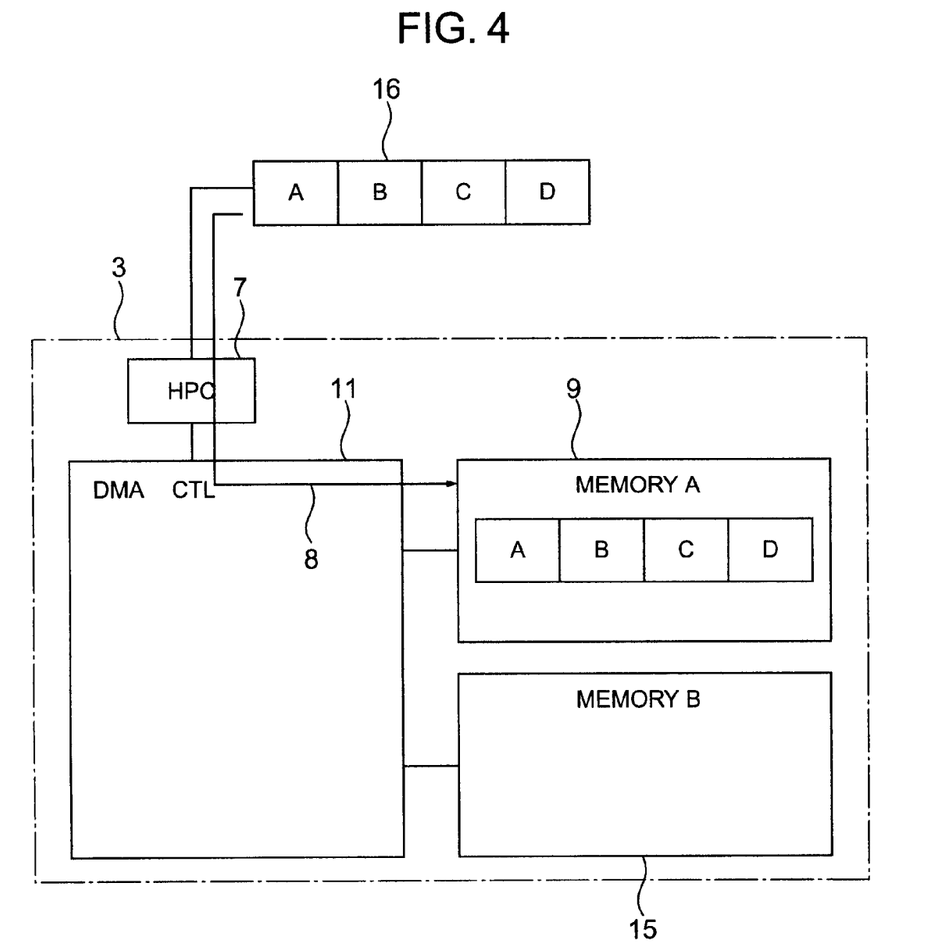
FIG. 4 is a block diagram showing a flow of data from a HOST to a memory.

FIG. 4 shows the flow of data from the HOST(1) to the memory. Data A(16), B(16), C(16), and D(16) are continuous data. Determination as to whether pieces of data are continuous data is made as follows: first, when transfer of the data A(16) is performed, the address of the data A(16) is stored in the MPU (6) illustrated in FIG. 2. Then, by checking whether the address of the data B(16) is contiguous to the address of the data A(16), determination as to the continuous data is made. The data is then stored in the memory A(9) in the direction of the flow indicated by reference numeral (8).

Figure 5:
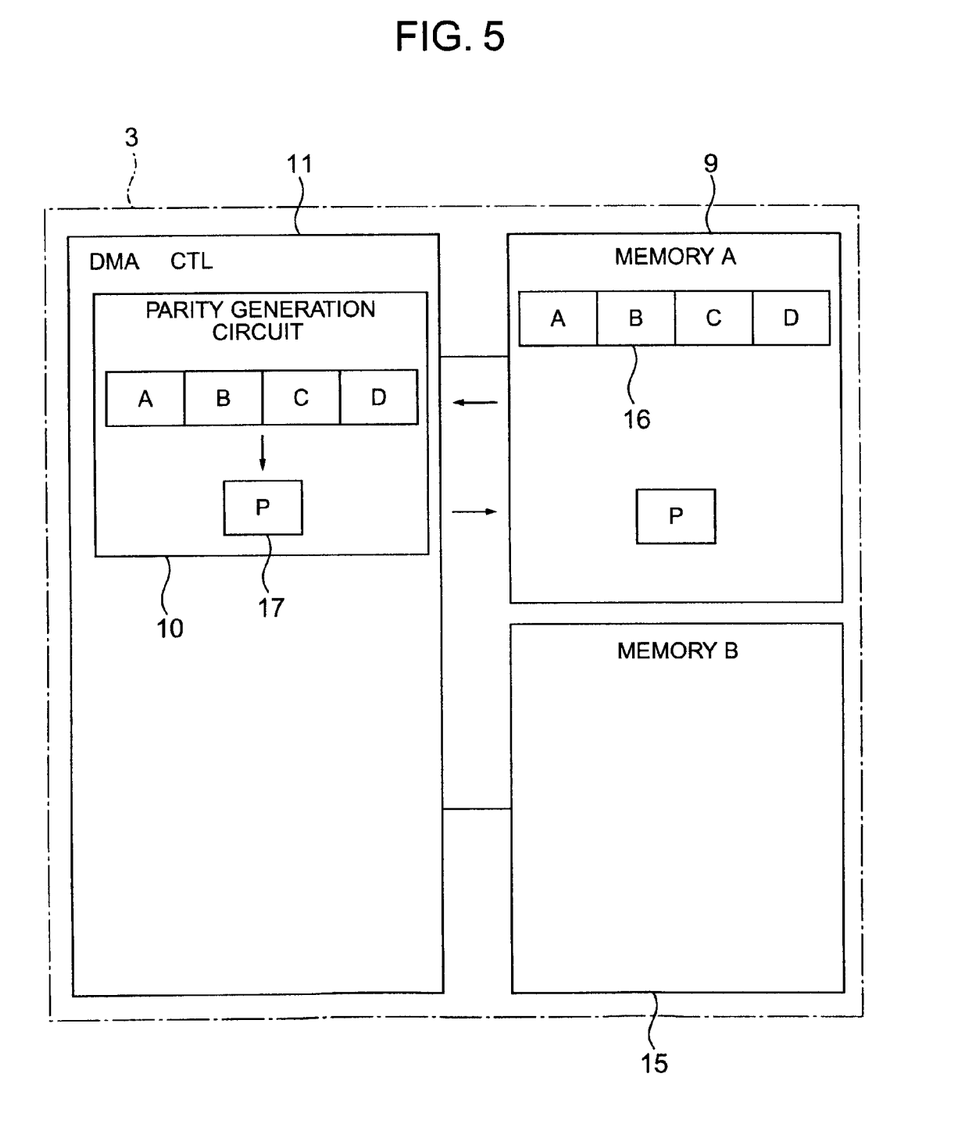
FIG. 5 is a block diagram showing flows of data when parity data is generated.

FIG. 5 shows flows of parity data generation performed on the data stored in the memory. The continuous data A(16), B(16), C(16), and D(16) stored in the memory A(9) are read into the parity generation circuit (10). Then, parity appending is performed on the data to generate parity data P(17), and then the parity data is written into the memory A(9).

Figure 6:
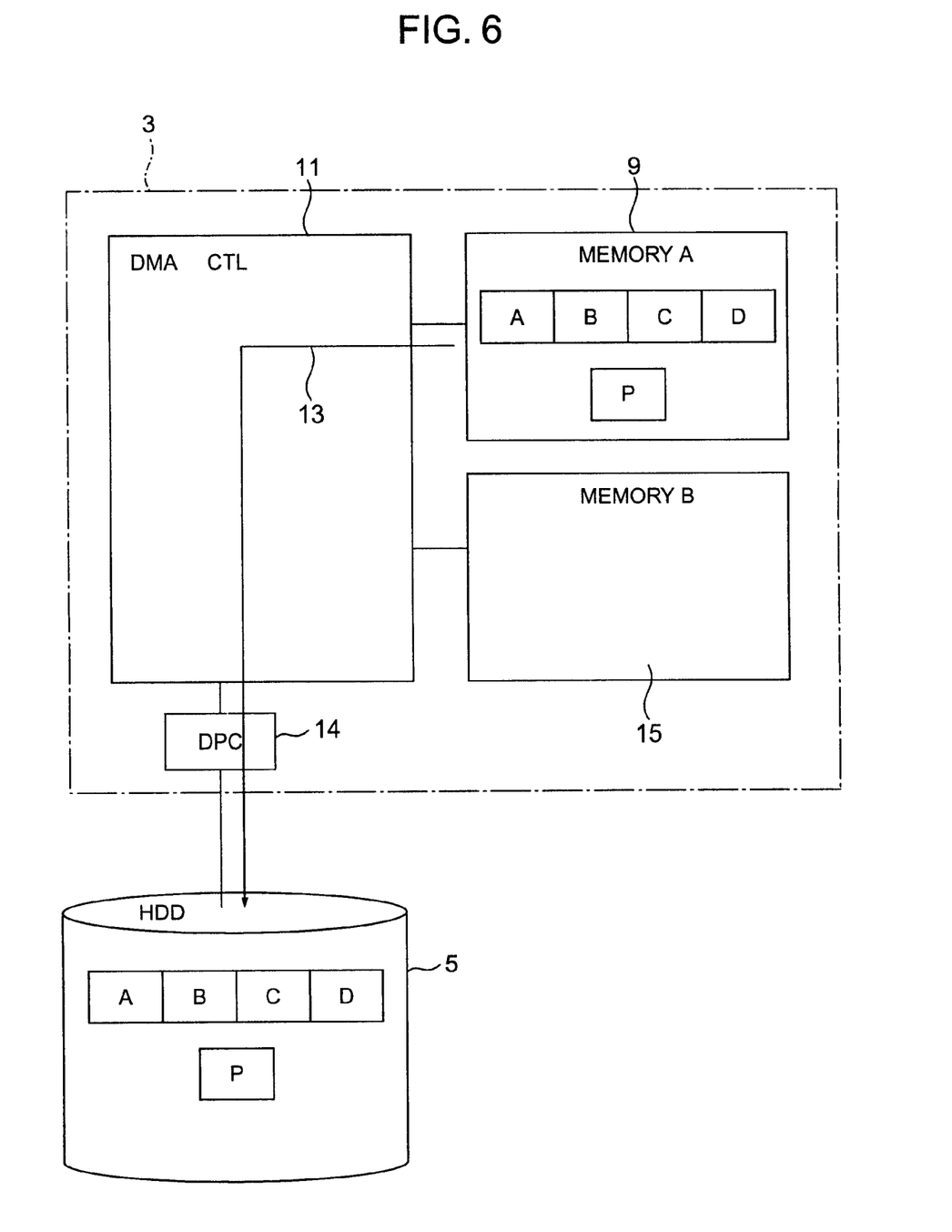
FIG. 6 is a block diagram showing a flow of data from the memory to a hard disk.

FIG. 6 shows the flow of the data and parity data stored in the memory being transferred to a hard disk. The parity data is generated by reading the continuous data. Accordingly, if high-speed memory is used, the performance of the disk array subsystem will improve. The data A, B, C, D, and parity data P stored in the memory A(9) are stored in an HDD.(5) in the direction of the flow indicated by reference numeral 13.

Data transfer illustrated in FIGS. 4 to 6 is all performed on the continuous data. For this reason, if high-speed memory used, the performance of the disk array subsystem will improve. Thus, the high-speed memory is used for the memory A. The MPU (6) stores the address of data first accessed, and on the basis of the stored address, the MPU (6) determines whether the address of data accessed next is contiguous to the address of the data first accessed, thereby making determination as to the continuous data.

Figure 7:
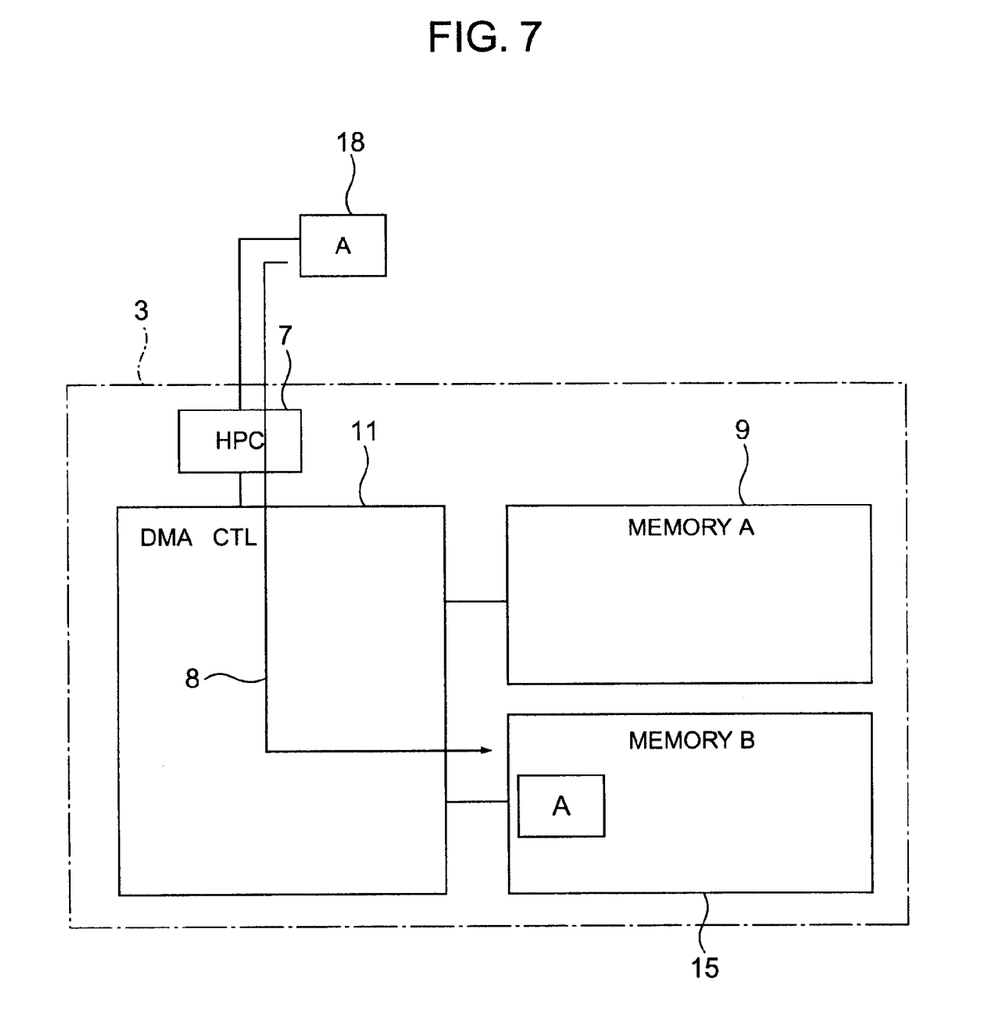
FIG. 7 is a block diagram showing a flow of data of a small amount.

FIG. 7 shows a flow of data having discrete addresses being transferred from the HOST. In this case as well, determination as to the discontinuous data is made in the same manner as determination as to the continuous data. That is, by checking whether the address of data is contiguous to immediately preceding data that has been accessed, determination is made. Then, data A(18) is stored in memory B(15) in the direction of the flow indicated by an arrow 8. Generally, the discontinuous data A is data for updating, and its amount is smaller than continuous data. Thus, even if low-speed memory is used, the performance of the disk array subsystem will not be affected. For this reason, the low-speed memory is used for the memory B.

Figure 8A:
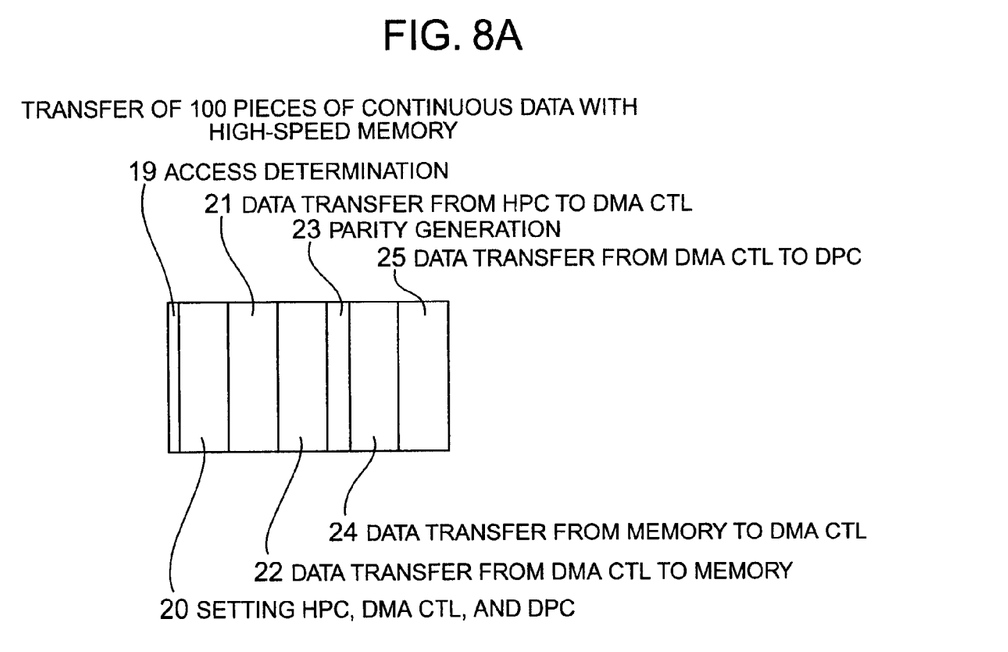
FIG. 8A and FIG. 8B are illustrative diagrams showing a comparison of performance of high-speed memory and performance of low-speed memory.
Figure 8B:
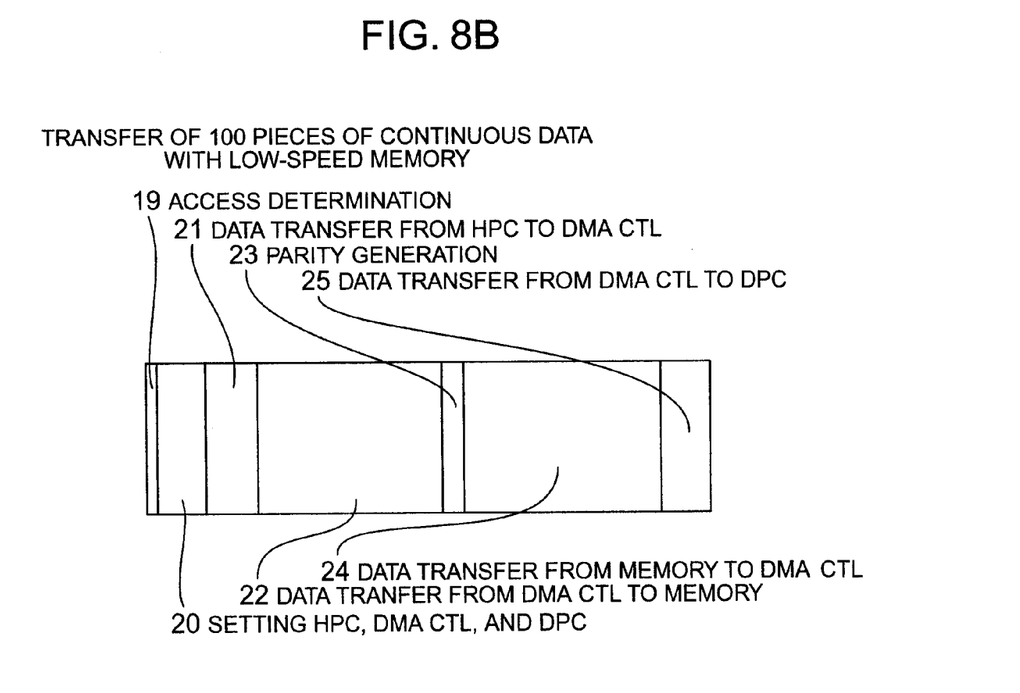

FIG. 8A and FIG. 8B show a performance comparison in the cases where continuous data is transferred with the high-speed memory and the low-speed memory. FIG. 8A shows the case where the high-speed memory is used, while FIG. 8B shows the case where the low-speed memory is used. This example shows a comparison of processing times elapsed for transfer of 100 pieces of continuous data to the DPC (14) after the type of access has been determined.

The time required for the data transfer becomes a sum of a time (19) required for access type determination, a time (20) required for setting the HPC, DMA CTL, and DPC, a time (21) required for data transfer from the HPC to the DMA CTL, a time (22) required for data transfer from the DMA CTL to the memory, a time (23) required for parity generation, a time (24) required for data transfer from the memory to the DMA CTL, and a time (25) required for data transfer from the DMA CTL to the DPC. A 250-MHz Synchronous SRAM is used for the high-speed memory, while a 100-MHz Synchronous DRAM is used for the low-speed memory. With the high-speed memory, it takes 4 CLKs to write 4 pieces of data, and it takes 5 CLKs to read 4 pieces of data. Since the high-speed memory operates at 250 MHz, 1 CLK becomes equal to $\frac{1}{250}\times 10^6=4$ ns. Thus, writing of 4 pieces of data takes 16 ns, while reading of 4 pieces of data takes 20 ns. With the low-speed memory, it takes 6 CLKs to write 4 pieces of data, while it takes 8 CLKs to read 4 pieces of data. Since the low-speed memory operates at 100 MHz, 1 CLK becomes equal to $\frac{1}{100}\times 10^6=10$ ns. Thus, writing of 4 pieces of data takes 60 ns, while reading of 4 pieces of data takes 80 ns. It can be seen that the high-speed memory offers 3.75 times the performance of the low-speed memory for a WRITE operation, and 4 times the performance of the low-speed memory for a READ operation. If this performance difference is considered in terms of memory access, the time for access determination, the time for setting the HPC, DMA CTL, and DPC, the times for data transfer from the HPC to the DMA CTL and from the DMA CTL to the DPC, and the time for parity generation are actually required for the data transfer. It can be seen that data transfer of 100 pieces of continuous data with the high-speed memory can be performed in half the time as with the low-speed memory.

Figure 9A:
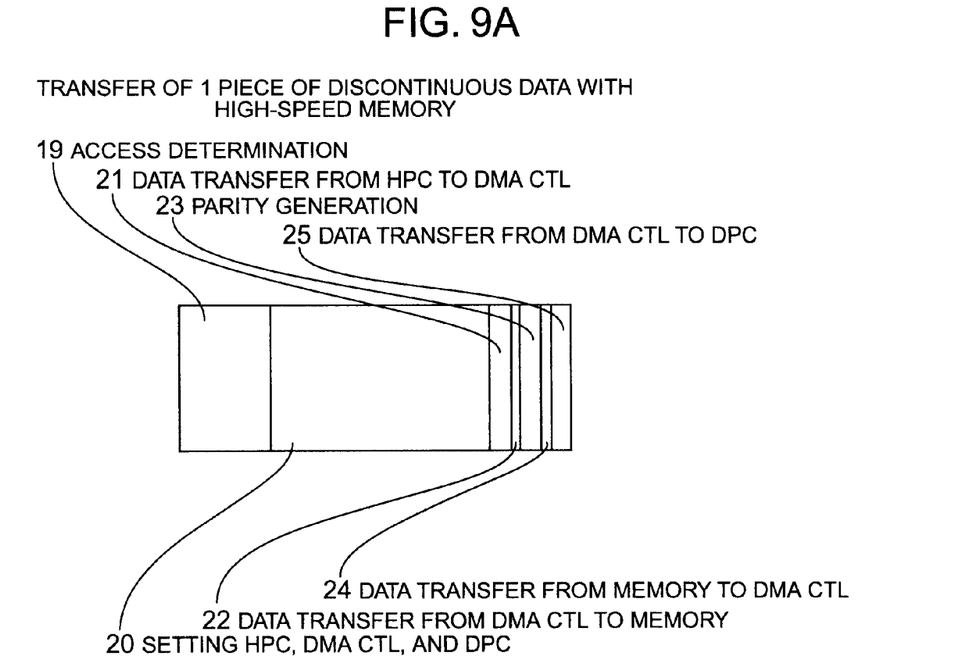
FIG. 9A and FIG. 9B are illustrative diagrams showing a comparison of performance of the high-speed memory and performance of the low-speed memory.
Figure 9B:
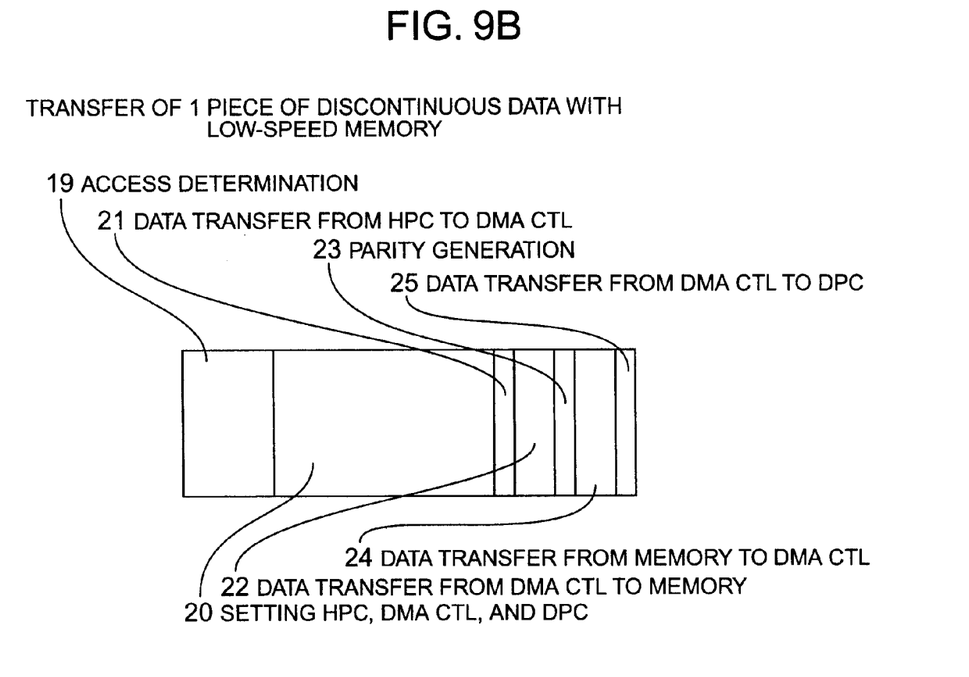

FIG. 9A and FIG. 9B show shows a comparison of processing times elapsed for transfer of discontinuous data to the DPC (14) after the type of access has been determined, in the cases where the high-speed memory and the low-speed memory are used. FIG. 9A shows the case where the high-speed memory is used for the transfer, while FIG. 9B shows the case where the low-speed memory is used for the transfer. In both cases, the time for access determination, the time for setting the HPC, DMA CTL, and DPC, the times for data transfer from the HPC to the DMA CTL and from the DMA CTL to the DPC, and the time for parity generation are required. As seen from FIGS. 9A and 9B, the processing time required with the low-speed memory is approximately 1.2 times the processing-time required with the high-speed memory. Thus, it can be seen that the data transfer performance of the disk array subsystem is not affected appreciably, even if the low-speed memory is used.

As described above, determination as to whether data to be transferred is continuous data or discontinuous data is made, and then, according to the type of data determined, the type of memory in which data is stored is selected. Thus, in order to accommodate the entire amount of storage required for the subsystem, only one type of memory having an access rate necessary for data processing that should be performed at a high speed is not employed in this subsystem. For the amount of storage for data processing that can be safely performed at a low speed, the low-speed memory is employed, in place of the high-speed memory. With this arrangement, a rise in costs can be reduced.

Further, two types of memory, which are the high-speed memory and the low-speed memory, are equipped with the subsystem, and then, according to the transfer performance of the devices in the subsystem, the required, matching capacity of the high-speed memory is determined. This capacity is then set to be the fixed capacity of the high-speed memory, and when the capacity of the subsystem has increased, the low-speed memory is used to cope with the increase. Alternatively, according to the usage requirements of a user, or a usage ratio between continuous data processing and discontinuous data processing, the capacities of the high-speed memory and the low-speed memory to be equipped with the subsystem are determined. With the arrangement described above, a desk memory system with high cost performance can be provided.

It will be further understood by those skilled in the art that the foregoing description has been made on embodiments of the invention and that various changes and modifications may be made in the invention without departing from the spirit of the invention and the scope of the appended claims.

For example, in the above embodiment, a description was directed to the case where a 250-MHz Synchronous SRAM is used for the high-speed memory, and a 100-MHz Synchronous DRAM is used for the low-speed memory. However, other types of memory can be used. In addition; the invention is not limited to the disk array subsystem, but can also be practiced in any memory system in which data is stored in memory.

According to the present invention, a rise in costs is kept to a minimum, and access time to a memory is reduced. The performance of the disk memory system can be thereby improved.

What is claimed is:

1. A disk memory device comprising:
a host interface for controlling connection to one or more a hosts;
a disk drive unit having one or more disk drives disposed therein;
a disk drive interface for controlling connection to the disk drive unit;
a data transfer control unit coupled to the host interface and the disk drive interface, for controlling transfer of data;
a cache memory coupled to the data transfer control unit, including a high-speed cache memory and a low-speed cache memory, for storing the data; and
a determination section that determines whether data from the one or more hosts to be saved to the cache memory is continuous data or discontinuous data,
wherein:
data determined to be continuous data is stored in said high-speed cache memory without being stored in said low-speed cache memory, and
data determined to be discontinuous data is stored in said low-speed cache memory without being stored in said high-speed cache memory.

2. The disk memory device according to claim 1, wherein the capacity of the high-speed memory and the capacity of the low-speed memory can be changed.

3. The disk memory device according to claim 1, wherein the capacity of the high-speed memory or the capacity of the low-speed memory can be changed, depending on addition of the disk drive in the disk drive unit.

4. The disk memory device according to claim 1, wherein the high-speed memory is an SRAM and the low-speed memory is a DRAM.

5. A disk memory device comprising:
a host interface for controlling connection to one or more hosts;
a disk drive unit having one or more disk drives disposed therein;
a disk drive interface for controlling connection to the disk drive unit;
a data transfer control unit coupled to the host interface and the disk drive interface, for controlling transfer of data;
a cache memory coupled to the data transfer control unit, including a high-speed cache memory and a low-speed cache memory, for storing the data; and
a processor for controlling the data transfer control unit and determining whether data from the one or more hosts to be stored in the cache memory is continuous data or discontinuous data, wherein:
data determined to be continuous data is stored in said high-speed cache memory without being stored in said low-speed cache memory, and
data determined to be discontinuous data is stored in said low-speed cache memory without being stored in said high-speed cache memory.

6. The disk memory device according to claim 5, wherein, in order to determine whether data is continuous data or discontinuous, the processor checks whether addresses of data from the host interface are contiguous.

7. The disk memory device according to claim 5, wherein the high-speed memory is an SRAM, and the low-speed memory is a DRAM.

8. A cache method for interfacing data transferred between at least one host and at least one storage device by using a high-speed cache memory and a low-speed cache memory, the method comprising the steps of:
determining whether data to be transferred between the at least one host and the at least one storage device is continuous data or discontinuous data;
storing continuous data in the high-speed cache memory; and
storing discontinuous data in the low-speed cache memory.

9. The method of claim 8, further comprising modifying at least one of the capacity of the high-speed memory and the capacity of the low-speed memory.

10. The method of claim 9, wherein the at least one storage device may include one or more disk drives, and the capacity of the high-speed memory or the capacity of the low-speed memory is modified based on the number of disk drives.

11. The method of claim 8, wherein the high-speed memory is SRAM and the low-speed memory is DRAM.

12. The method of claim 8, wherein the step of determining whether the data is continuous data or discontinuous data comprises the step of determining whether or not addresses of the data is continuous.

13. The method of claim 8, wherein:

responsive to the data being continuous data, data is stored in the high-speed cache memory without passing through the low-speed cache memory; and responsive to the data being discontinuous data, data is stored in the low-speed cache memory without passing through the high-speed cache memory.

* * * * *